No. 878,676. PATENTED FEB. 11, 1908.
F. SCHARF.
VEGETABLE SLICER.
APPLICATION FILED JULY 11, 1907.

Witnesses
J. L. Jenkins
C. H. Griesbauer

Inventor
Frank Scharf.
by H. B. Willson & Co.
Attorneys

UNITED STATES PATENT OFFICE.

FRANK SCHARF, OF DEVILS LAKE, NORTH DAKOTA.

VEGETABLE-SLICER.

No. 878,676.  Specification of Letters Patent.  Patented Feb. 11, 1908.

Application filed July 11, 1907. Serial No. 383,298.

*To all whom it may concern:*

Be it known that I, FRANK SCHARF, a citizen of the United States, residing at Devils Lake, in the county of Ramsey and State of North Dakota, have invented certain new and useful Improvements in Vegetable-Slicers; and I do declare the following to be a full, clear, and exact description of the invention, such as will enable others skilled in the art to which it appertains to make and use the same.

This invention relates to vegetable slicers, and has for its object to provide a device of this kind which will be simple, cheap and efficient, and which can be readily secured in position for use or removal therefrom, and which can be easily cleaned after such use.

Figure 1:
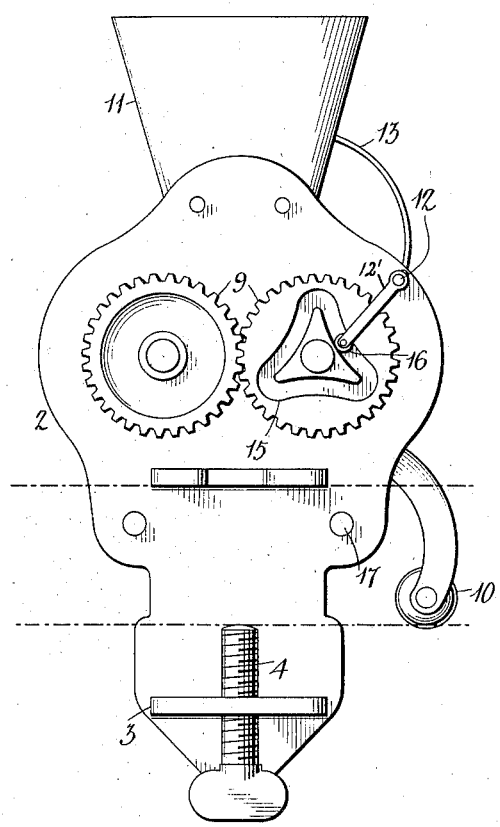
Figure 2:
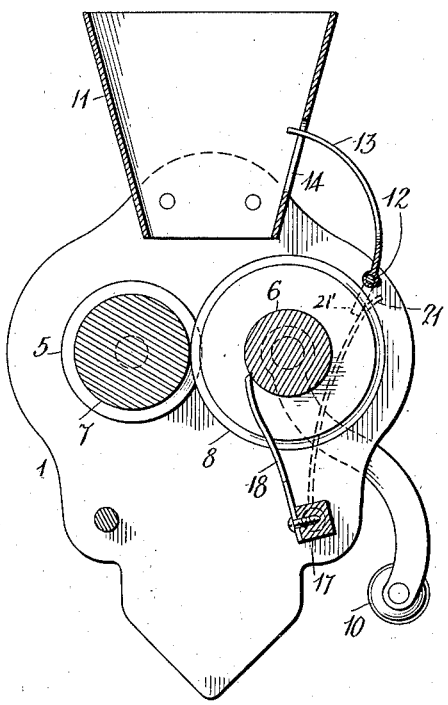
Figure 3:
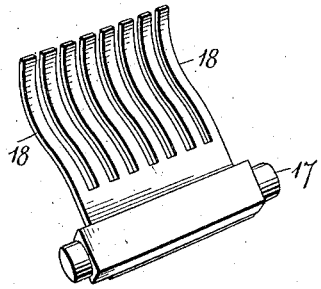
Figure 4:
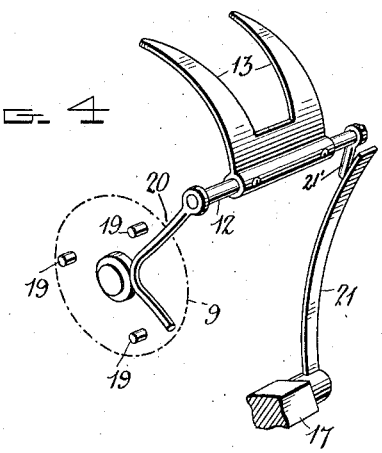

In the accompanying drawings, which illustrate the invention, Figure 1 is a side elevation of a machine embodying the invention; Fig. 2 is a vertical cross sectional view of the same; Fig. 3 is a detail view of the cleaner, and Fig. 4 is a perspective view of the feeder and a different means for operating the same.

Referring more particularly to the drawings, 1 and 2 indicate the side pieces of the main frame of the machine, the rear one of which, as 2, is provided with a clamp, 3, for securing it in position, as upon the side of a table or a shelf, by means of a screw, 4.

Journaled within the frame are two rollers, 5 and 6, one of which is provided with circumferential grooves or channels, 7, and the other one is provided with a series of sharpened disks or blades, 8, which are adapted to enter the grooves, 7. The roller 5 is preferably formed from soft material, as lead, and the knives or disks, 8, are formed from steel, whereby when the machine is rotated, the disks will not become dulled by contact with the grooved roller.

The two rollers are caused to turn in unison, either by frictional contact, or, preferably, by means of gear wheels, 9, at the rear of the frame, and power is applied to one of the rollers, preferably the disk roller, by means of a crank or handle, 10.

The material to be operated upon is fed in between the two rollers through a hopper, 11, which may be of any suitable shape and size. Pivotally mounted in the frame of one side of the hopper, is a feeder, which consists of a shaft, 12, and two or more curved arms, 13, which are rigidly secured thereto and project through openings, 14, in the side of the hopper in position for engaging with the contents of the hopper and forcing it down toward the rollers as the shaft and arms are oscillated.

In Fig. 1 of the drawings, one of the gear wheels 9, is shown provided with a cam-like groove, 15, within which is seated the end of an arm 12' on the shaft, 12, which is provided preferably with an anti-friction bearing roller, 16, although the drawings show the groove as being adapted to cause three reciprocations of the feeder for every rotation of the rollers, it is evident that more or less reciprocation could be secured by changing the groove 15 accordingly.

Pivotally mounted in the lower portion of the frame is a rock shaft, 17, to which a cleaner is secured, the cleaner being preferably in the form of a comb, with its teeth, 18, adapted to project up between the disks, 8, and thereby cause any material that is wedged between the disks to be dislodged and finally dropped out of the machine.

Instead of actuating the feeder as above described, one of the gear wheels, 9, can be provided with shoulders or pins 19 which are adapted to engage with an arm 20 on the end of the shaft 12, as the wheel is rotated. The feeder is returned to its normal position by means of a spring, 21, after it has been actuated by the pins, 19, and it will thereby be caused to oscillate in the same manner as is secured by the cam movement heretofore described. The spring 21 is preferably secured at its lower end to the rock shaft, 17, so as to normally hold the teeth of the cleaner between the disks and at its upper end it engages with a pin or projection 21' on the shaft 12, whereby it also normally holds the feeder arms out of the hopper.

As above described, it will be seen that my improved vegetable slicer can be quickly secured in position, and as quickly removed therefrom, and when being operated the material, as vegetables of any kind, as beans, peas, and other such articles, can be quickly and efficiently sliced or cut into small pieces for the purpose of better preparing such things for food. In case the articles should have a tendency to be wedged or clogged in the hopper, the agitation caused by the reciprocation of the feeder will break up such congestion and cause the even feeding of the machine. The action of the fingers or teeth of the scraper will automatically cleanse the machine and thereby prevent the rollers from becoming clogged or inoperative.

Having thus fully described my invention, what I claim as new, and desire to secure by Letters Patent is:

In a vegetable slicer, a frame, coacting slicing rolls therein, one of which is provided at one end with means for actuating a feeder, a hopper on the frame having an opening in one side, a shaft journaled adjacent to said opening and provided with curved feeder arms projecting therethrough, an arm at one end of said shaft for engaging with said actuating means to oscillate the shaft, a projection on the other end of said shaft, a shaft below one of the rolls provided with fingers adapted to engage with said roll, and a spring on one end of said last mentioned shaft, the free end of which engages with the projection on the feeder shaft to normally hold the feeder out of the hopper.

In testimony whereof I have hereunto set my hand in presence of two subscribing witnesses:

FRANK SCHARF.

Witnesses:
W. M. ANDERSON,
HENRY M. GRAY.